US012746166B2

(12) United States Patent
Hitchcock et al.

(10) Patent No.: US 12,746,166 B2
(45) Date of Patent: Sep. 29, 2026

(54) PATIENT TABLE WITH HEATED PAD

(71) Applicant: Baxter Medical Systems GmbH + Co. KG, Saalfeld (DE)

(72) Inventors: David Hitchcock, Westford, MA (US); Mark Watercutter, Mt. Pleasant, SC (US); Georg Köllner, Thüringen (DE); Dieter Ceglarz, Munich (DE); Ryan Matthew Rasmussen, Marlborough, MA (US)

(73) Assignee: Baxter Medical Systems GmbH & Co. KG, Saalfeld (DE)

( * ) Notice: Subject to any disclaimer, the term of this patent is extended or adjusted under 35 U.S.C. 154(b) by 358 days.

(21) Appl. No.: 18/347,912

(22) Filed: Jul. 6, 2023

(65) Prior Publication Data

US 2024/0009054 A1 Jan. 11, 2024

Related U.S. Application Data

(60) Provisional application No. 63/359,051, filed on Jul. 7, 2022.

(51) Int. Cl.
*A61G 13/12* (2006.01)
*A61G 13/10* (2006.01)

(52) U.S. Cl.
CPC ......... *A61G 13/126* (2013.01); *A61G 13/108* (2013.01); *A61G 13/1225* (2013.01)

(58) Field of Classification Search
CPC ................ A61G 13/126; A61G 13/108; A61G 13/1225; A61G 2210/90; A61G 7/05784; A61G 7/001; A61G 13/1245; A61G 13/122; A61G 2203/70; A61G 10/02; A61G 13/12; A61G 10/005; A61G 7/05; A61G 2210/70; A61G 2203/46; A61G 13/121; A61G 13/10; A61G 7/05769; A61G 7/05776; A47C 21/044; A47C 21/048; A47C 27/121; A47C 21/046; A47C 27/10; A47C 27/081; A47C 27/006; A47C 21/042; F24D 5/02; F24D 5/06; A61B 18/16; A61F 7/007; A61F 2007/0071; A61F 2007/0096; A61F 7/08
(Continued)

(56) References Cited

U.S. PATENT DOCUMENTS 6,967,309 B2 11/2005 Wyatt et al.
8,772,676 B2 7/2014 Augustine et al.
(Continued)

FOREIGN PATENT DOCUMENTS

KR 20180134692 A * 12/2018 ........... A47C 21/044
WO WO-2019223896 A1 * 11/2019 ......... A61G 7/05784

*Primary Examiner* — Madison Matthews
(74) *Attorney, Agent, or Firm* — Price Heneveld LLP

(57) ABSTRACT

A patient operating table includes a support mattress with a plurality of pads. The plurality of pads includes a central pad located to support a midsection of a patient's body. The central pad includes an outer shell with a seam that has a hermetic seal and defines a cell therein. A support frame is integrally connected to the central pad. A central pedestal is located under the central pad and carries the support mattress on a base frame. A heating element and a hygroscopic substance is located in the cell. A conduit extends from the heating element and through the outer shell at a sealing ring that is connected to the outer shell with a hermetic seal.

16 Claims, 12 Drawing Sheets

(58) Field of Classification Search
USPC ... 5/713, 710, 715, 714, 654, 655.3, 81.1 R, 5/421, 652.1
See application file for complete search history.

(56) References Cited

U.S. PATENT DOCUMENTS

| | | | | |
|---|---|---|---|---|
| 9,693,891 | B2 | 7/2017 | MacIntyre-Ellis et al. | |
| 11,266,525 | B2 | 3/2022 | Kaforey et al. | |
| 2012/0279953 | A1* | 11/2012 | Augustine | A61F 7/08 219/217 |
| 2013/0073012 | A1 | 3/2013 | Ellis | |
| 2014/0316495 | A1 | 10/2014 | Augustine et al. | |
| 2019/0217548 | A1 | 7/2019 | Augustine et al. | |

* cited by examiner

PATIENT TABLE WITH HEATED PAD

CROSS-REFERENCE TO RELATED APPLICATION

This application claims priority to and the benefit under 35 U.S.C. § 119(e) of U.S. Provisional Application No. 63/359,051, filed on Jul. 7, 2022, entitled "PATIENT TABLE WITH HEATED PAD," the disclosure of which is hereby incorporated herein by reference in its entirety.

FIELD OF THE DISCLOSURE

The present disclosure generally relates to a patient table and, more particularly, to a patient table with at least one pad that can be heated.

SUMMARY OF THE DISCLOSURE

According to one aspect of the disclosure, a patient operating table includes a support mattress with a plurality of pads. The plurality of pads includes a central pad located to support a midsection of a patient's body. The central pad includes an outer shell with a seam that has a hermetic seal and defines a cell therein. A support frame is integrally connected to the central pad. A central pedestal is located under the central pad and carries the support mattress on a base frame. A heating element and a hygroscopic substance is located in the cell. A conduit extends from the heating element and through the outer shell at a sealing ring that is connected to the outer shell with a hermetic seal.

According to another aspect of the disclosure, a pad for a patient operating table includes an outer shell that has a bottom shell surface for connection to the patient operating table and a top shell surface for supporting a patient. A cell is defined within the outer shell and at least one cushion is located in the cell. At least one heating element is located in the cell between the at least one cushion and the top shell surface. At least one vent is connected to the outer shell with a hermetic seal. The at least one vent includes a filtering membrane that permits a passage of air and blocks a passage of at least one pathogen.

According to another aspect of the disclosure, a patient operating table includes a support mattress with at least one pad. The at least one pad includes an outer shell that defines a cell. A membrane is connected to the outer shell with a hermetic seal. The membrane is rated to prevent select pathogens from entering the cell. A heating element is located in the cell and is formed of at least one of a flexible or a compressive material.

According to another aspect of the disclosure, a patient operating table includes a support mattress with at least one pad. A support mattress is connected to the at least one pad. The at least one pad includes an outer shell with a seam that has a hermetic seal and defines a cell therein. A heating element and a hygroscopic substance is located in the cell. A conduit extends from the heating element and through the outer shell at a sealing ring that is connected to the outer shell with a hermetic seal.

These and other features, advantages, and objects of the present disclosure will be further understood and appreciated by those skilled in the art by reference to the following specification, claims, and appended drawings.

DETAILED DESCRIPTION

Figure 1:
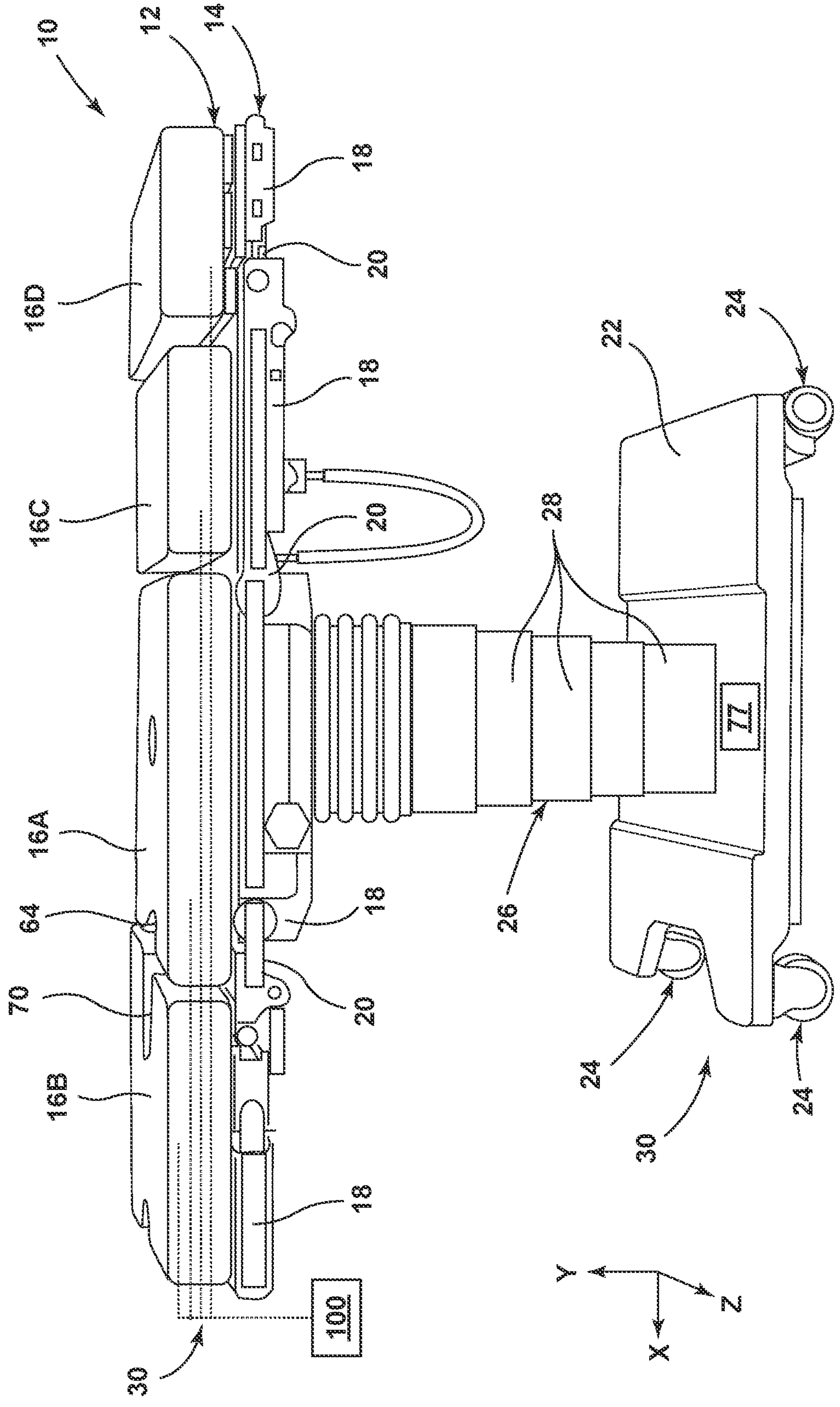
FIG. 1 is a front perspective view of an operating table that includes a heating system provided to heat a patient support mattress according to an aspect of the present disclosure.

The present illustrated embodiments reside primarily in combinations of method steps and apparatus components related to a patient table with at least one pad that can be heated. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring initially to FIG. 1, reference numeral 10 generally designates a patient operating table. The patient operating table 10 includes a patient support mattress 12 and a mattress support frame 14 that supports and positions the patient support mattress 12. In some embodiments, the patient support mattress 12 includes one or more (e.g., two, three, four, five, or six) pads 16A-16D and the mattress support frame 14 may include one or more sub-support frames 18 (e.g., two, three, four, five, or six). The sub-support frames 18 may be operably coupled by linkages 20 that permit articulation between adjacent sub-support frames 18 to position a patient in varying orientations. In some embodiments, the one or more pads 16A-16D may be integrally (e.g., permanently or with additional tools and/or fasteners) connected with the sub-support frames 18 such that they cannot be removed after assembly. In other embodiments, the one or more pads 16A-16D may be non-integrally (e.g., removable) connected with the sub-support frames 18 such that they can be connected to and removed from the sub-support frames 18. It should also be appreciated that select pads 16A-16D may be integrally connected and select pads 16A-16D may be non-integrally connected within the patient operating table 10. The non-integral connection may be beneficial to remove the one or more pads 16A-16D for cleaning, replacement, or servicing. The pads 16A-16D may include a central pad 16A, located centrally to support a midsection of a patient, a top pad 16B to provide support for a head of a patient, and lower pads 16C and 16D to support the legs of a patient (e.g., on either side of the knee). The patient operating table 10 further includes a base frame 22 that may include a plurality of caster assemblies 24 that allow the patient operating table 10 to roll between different locations in a medical facility (e.g., along an X-axis and a Z-axis). A central pedestal 26 operably connects the base frame 22 to the mattress support frame 14. The central pedestal 26 may be vertically (e.g., along a Y-axis) adjustable between a variety of positions to suit the needs of a caregiver. More particularly, the central pedestal 26 may include a series of telescopically adjustable sleeves 28.

In some embodiments, the central pedestal 26 connects centrally on the base frame 22 between the caster assemblies 24 and centrally on the mattress support frame 14, such that a patient's center of mass is substantially aligned therewith along the Y-axis. In some embodiments, a central wheel (not shown) may be located under the central pedestal 26 to facilitate movement around the medical facility. The central wheel may be driven via a motor, and/or the like, and may be moveable between an operating (i.e., rolling) position and a stowed position.

The patient operating table 10 includes a heating system 30 provided to heat the patient support mattress 12. For example, at least one pad 16A-16D of the patient support mattress 12 (e.g., two, three, four, five, or six) may be heated. The heat provided by the heating system 30 regulates a temperature of a patient on the patient operating table 10 for comfort, circulation, normothermia, and other health and operational benefits. The heating system 30 includes a controller or control system 100 that controls operation of components in the heating system 30. As will be described in greater detail below, the heating system 30 may be configured to (e.g., via the controller or control system 100) simultaneously heat each pad 16A-16D, select pads 16A-16D, and/or to simultaneously heat two or more pads 16A-16D at the same or varying temperatures.

Figure 2:
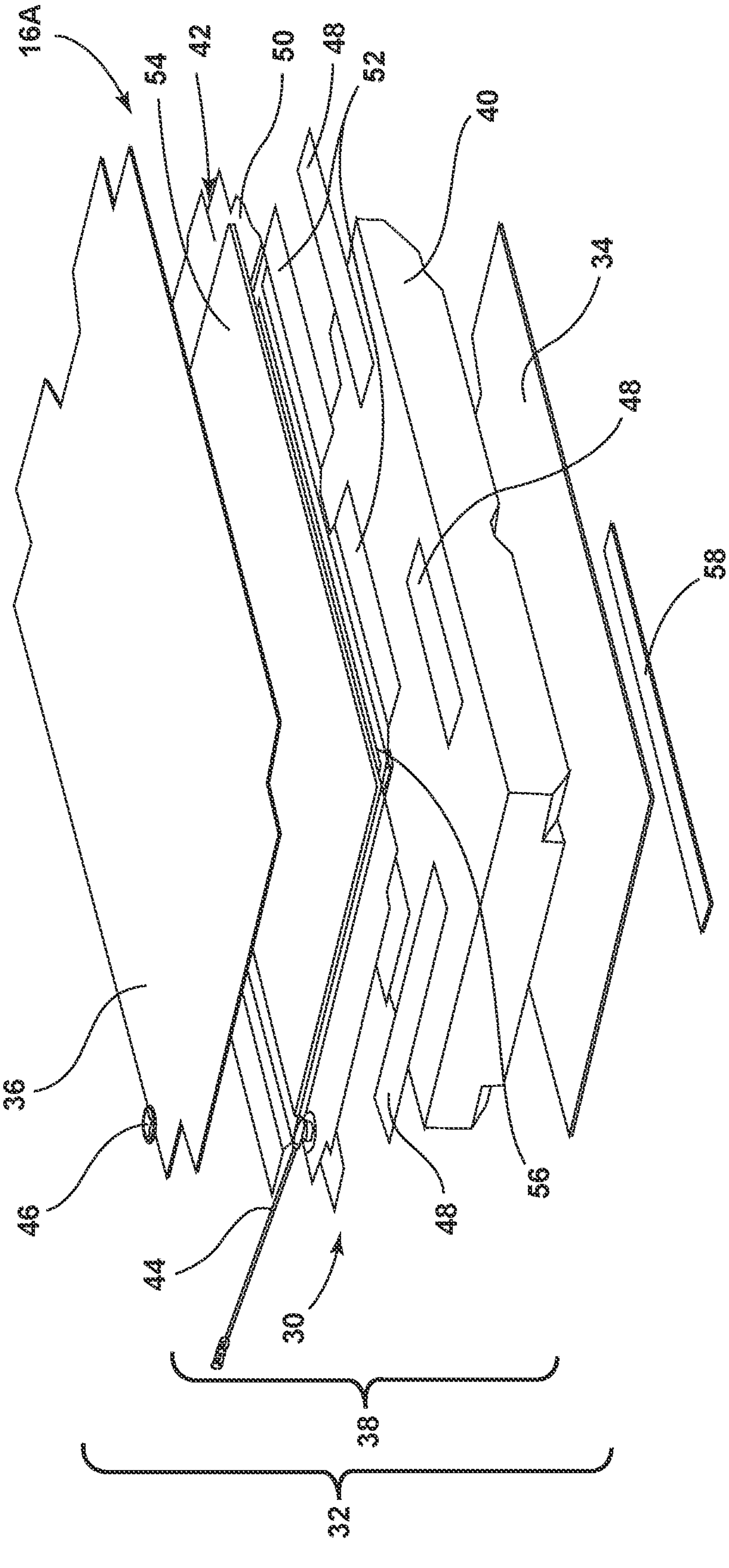
FIG. 2 is a side perspective view of a central pad on an operating table, shown in a disassembled condition according to an aspect of the present disclosure.

With reference now to FIG. 2, the central pad 16A, with components of the heating system 30 incorporated therein, is illustrated in a disassembled condition. The central pad 16A includes an outer shell 32 that includes a bottom shell surface 34 for interfacing with the support frame 14 and a top shell surface 36 for interfacing with a patient. The bottom shell surface 34 and the top shell surface 36 are connected to one another integrally and/or otherwise via one or more seams with a hermetic seal to form a cell 38 therein. The outer shell 32 may be formed of a single layer or via multiple layers. In some embodiments, the outer shell 32 is formed of polyester or nylon. For example, from an outer surface that extends toward the cell 38, the outer shell 32 may include one or more of a first layer of knitted polyester or nylon fabric, a second layer of adhesive, a third layer of polyurethane, and a fourth layer of polyurethane. The outer shell 32 may be hermetic to prevent liquids, air, and particulates from entering the cell 38 and may also be durable to cleaning agents. The cell 38 may contain one or more cushions 40 to provide comfort to a patient. The one or more cushions 40 may be formed of a material that has elastic memory such that after a patient's weight is removed, the cushion expands to an original shape. For example, the one or more cushions 40 may be formed of a foam material (e.g., a viscoelastic foam, a polyethylene foam, a polyurethane foam, an open-cell foam, a closed-cell foam, and/or the like). In some embodiments, the foam material may have a volumetric weight of between 10 and 20 kg/m3 (i.e., 1 and 3 lbs/ft3), for example, about 16 kg/m3 (i.e., about 1.8 lbs/ft3) and a stiffness of about 25% at 703 kg/m2 (i.e., about 45 lbs per 50 inch2). The cell 38 may further contain one or more heating elements 42 of the heating system 30. The one or more heating elements 42 may be located between the top shell surface 36 and the one or more cushions 40, between the bottom shell surface 34 and the one or more cushions between two or more cushions 40, and/or located within the cushion 40 (enveloped therein). The one or more heating elements 42 may be formed of a material that generates and radiates heat as a result of receiving energy (e.g., electricity). In some embodiments, the heating elements 42 are configured as Augustine Temperature Management ("ATM") heaters. One or more conduits 44 may connect to the one or more heating elements 42 in each or select pads 16A-16D for supplying energy thereto. In some embodiments, the one or more conduits 44 may include a plurality of conduits 44 with each conduit 44 connecting to a different one of the heating elements 42 going to each or select pads 16A-16D. In some embodiments, the heating element 42 is configured as a conductive sheet (e.g., conductive from left-to-right or right-to-left) that expands a portion (e.g., a majority or less) of the associated pad 16A-16D. In some embodiments, each pad 16A-16D may include a single heating element 42 configured as a conductive sheet. In some embodiments, the one or more heating elements 42 may each be at least partially formed of a material with a resistance between 10Ω and 1 MΩ(e.g., about 15Ω) at an applied voltage, such that each heating element 42 has a density of 0.2 to 0.4 watts/sq. in.

The one or more sealing rings 46 and seams in the outer shell 32 may be hermetically sealed with a hermetic seal (e.g., via heat bonding, adhesives, and/or the like). The one or more heating elements 42 may be connected to the central pad 16A to prevent and/or limit relative movement therebetween. For example, the one or more heating elements 42 may be connected to the central pad 16A via mechanical connectors, adhesive, tapes, and/or the like. In the illustrated embodiment, the heating element 42 is connected to the cushion 40 via an adhesive 48 (e.g., a glue-type substance, a tape substrate with adhesive, a tape with pressure sensitive adhesive, and/or a pressure sensitive adhesive without a substrate). In some embodiments, the adhesive 48 may be located across substantially an entire top or bottom surface of the one or more heating elements 42 and/or the cushion 40. In the illustrated embodiment, the adhesive 48 is located in a plurality of localized regions on the one or more heating elements 42.

With continued reference to FIG. 2, the one or more heating elements 42 may include a first plate 50 (i.e., radiant plate) that defines a series of flanges 52 on an outer perimeter thereof. The adhesive 48 may be located on the flanges 52 and/or other localized regions on the first plate 50. The one or more heating elements 42 may further include a second plate 54 (i.e., diffusive plate) disposed on top and connected to the first plate 50 via a pair of connection bands 56. The connection bands 56 may be bonded to both the first plate 50 and the second plate 54 via adhesive, mechanical connectors, and/or the like. The connection bands 56 may extend along opposite peripheral edges of an outer perimeter of the second plate 54. In some embodiments, the connection bands 56 may extend along substantially over the entire outer perimeter of the second plate 54. In some embodiments, the first plate 50 is formed of a conductive material (e.g., a metal sheet) and is connected to the at least one conduit 44. The first plate 50 may be configured to radiate heat upon being energized. The second plate 54 may be in direct contact with the first plate 50 and formed of a different material than that of the first plate 50. For example, the second plate 54 may be formed of a material containing thermally diffusive material (e.g., polyurethane foam) and/or a material with elastic memory (e.g., a foam) to provide extra comfort to a patient. The one or more heating elements 42 may include a non-condensation construction that is configured to prevent condensation within the cell 38 to avoid degradation of the components and biological growth within the cell 38. For example, a corrosion inhibiter layer, silica gel packs, a hygroscopic substance, and/or other moisture absorption elements may be located within the cell 38. In some embodiments, the central pad 16A, including the first plate and second plate 54, is formed of a material that exhibits X-ray permeability. The adhesive 48 may be pressure sensitive such that it is non-reactive until pressure is applied to form a bond between the heating element 42 and the cushion 40. The bottom shell surface 34 includes at least one connecting element 58 for connection to the support frame 14. For example, a Velcro®-type material on a carrier strip with a series of loops or hooks that releasably connect to an element that corresponds on the support frame 14 (e.g., nylon, polyester, fleece, and/or the like). In some embodiments, the second plate 54 is formed of a first foam material and the one or more cushions 40 are formed of a second foam material that has less density than the first foam material (e.g., about twice as dense or more). In some embodiments, the second plate 54 is formed of a first material and the one or more cushions 40 are formed of a second material that has less thermal diffusivity than the first material. In some embodiments, the outer shell 32 and connecting elements 58 are machine washable.

Figure 3A:
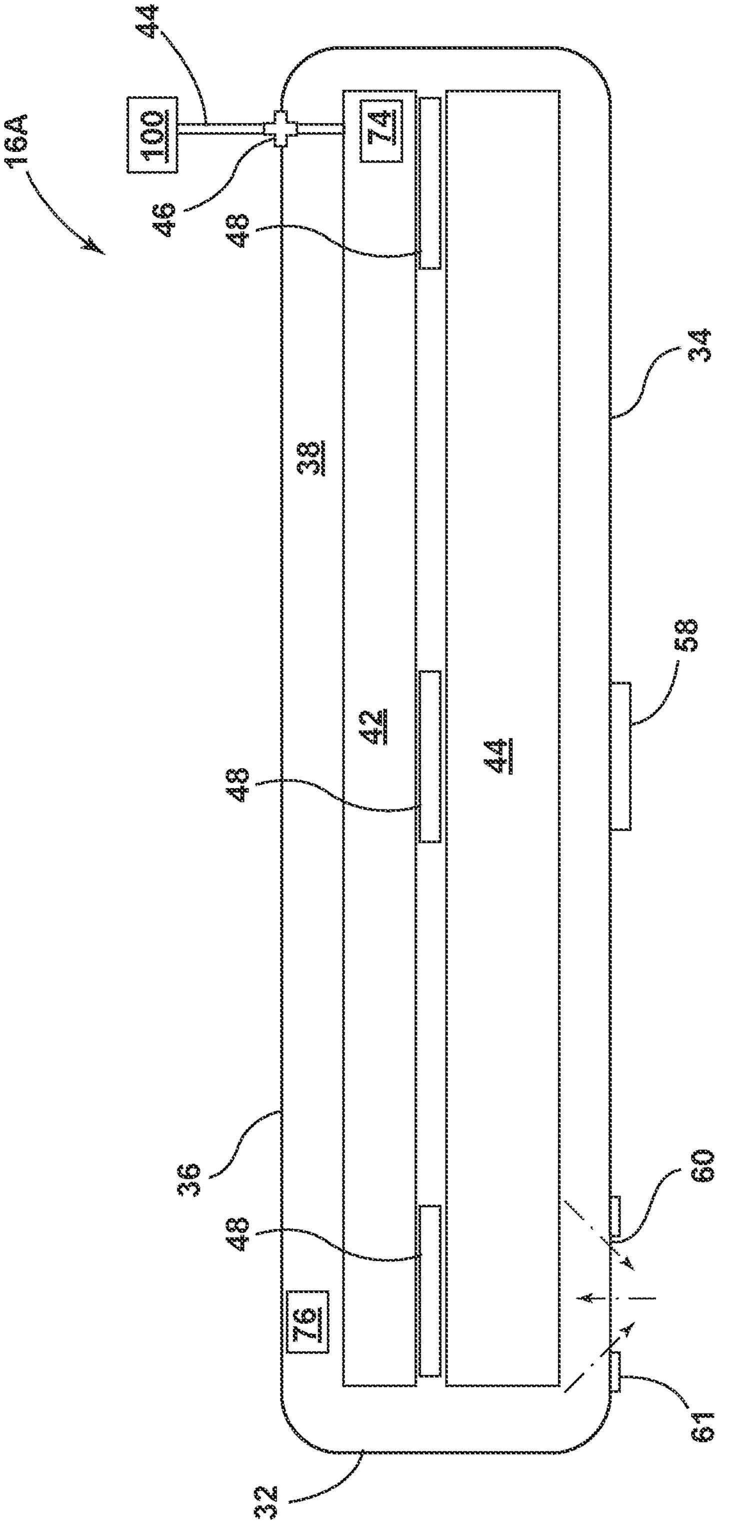
FIG. 3A is a cross-sectional side view of a central pad according to an aspect of the present disclosure.
Figure 3B:
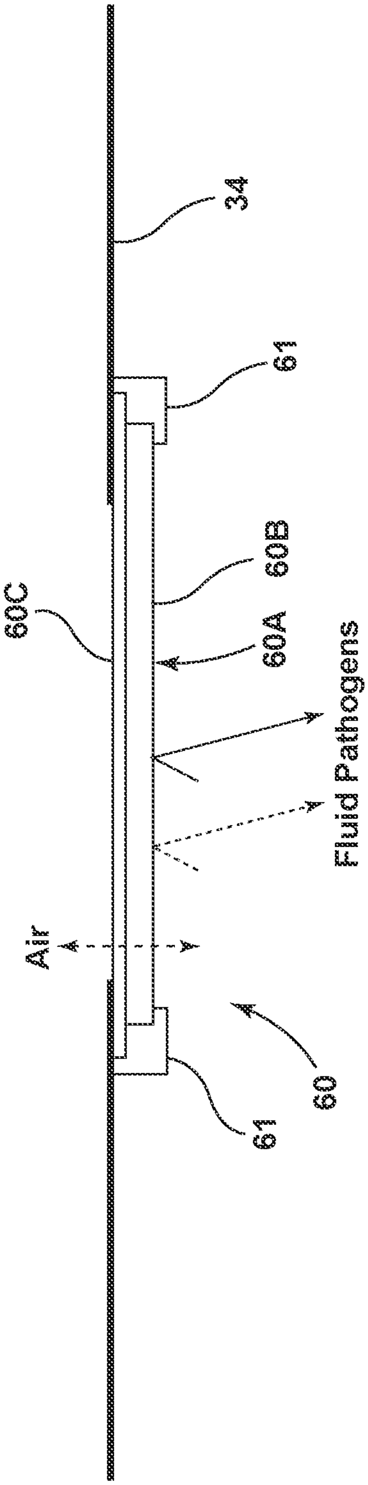
FIG. 3B is an enlarged cross-sectional side view of a vent in a central pad according to an aspect of the present disclosure.

FIGS. 3A and 3B schematically illustrate a cross-sectional view of the central pad 16A. While FIGS. 2 and 3 illustrate the sealing ring 46 located on the top shell surface 36, it should be appreciated that the one or more conduits 44 and the one or more sealing rings 46 may be located on other areas of the outer shell 32 (e.g., the bottom shell surface 34, side surfaces, and/or the like). One or more vents 60 (e.g., two, three, four, five, or six) may be located on the outer shell 32 that allow pressure to be released from the cell 38 when supporting the patient's weight. The vents 60 may include filtering membranes 60A that are rated to prevent a passage of all known or select pathogens (e.g., bacteria, viruses, and microorganisms) from entering the cell 38 while still permitting a passage of air. For example, the filtering membrane 60A may be formed of a single layer or multiple layers. In some embodiments, the filtering membrane 60A includes a partially permeable layer 60B that is impermeable to liquid but permeable to air. The filtering membrane 60A may also include a supporting layer 60C (e.g., a mesh) that supports the partially permeable layer 60B. In some embodiments, the partially permeable layer 60B is formed of an oleophobic or a hydrophobic material, such as a thermoplastic non-woven material (e.g., a polytetrafluoroethylene). In some embodiments, the partially permeable layer 60B includes pores that prevent particulates larger than 0.1 microns, for example, 0.1 to 5 microns. The vents 60 (e.g., the partially permeable layer) may include an outer material 61 bonded around a perimeter thereof to facilitate connection to the outer shell 32. The outer material 61 may be formed of a polyurethane and hermetically sealed with a hermetic seal to both the partially permeable layer and the outer shell 32 (e.g., via heat bonding, adhesives, and/or the like).

Figure 4:
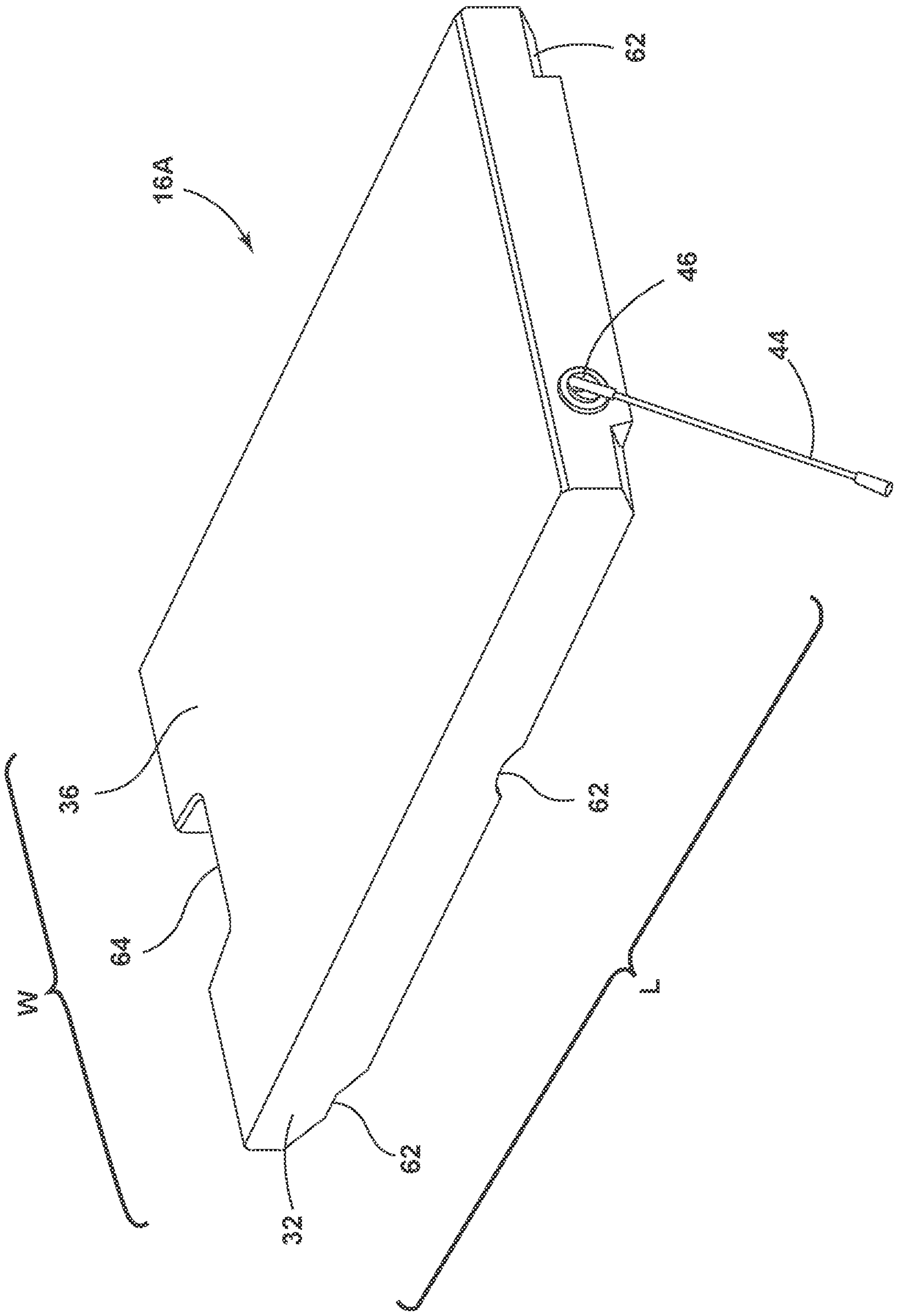
FIG. 4 is a top perspective view of a central pad according to an aspect of the present disclosure.
Figure 5:
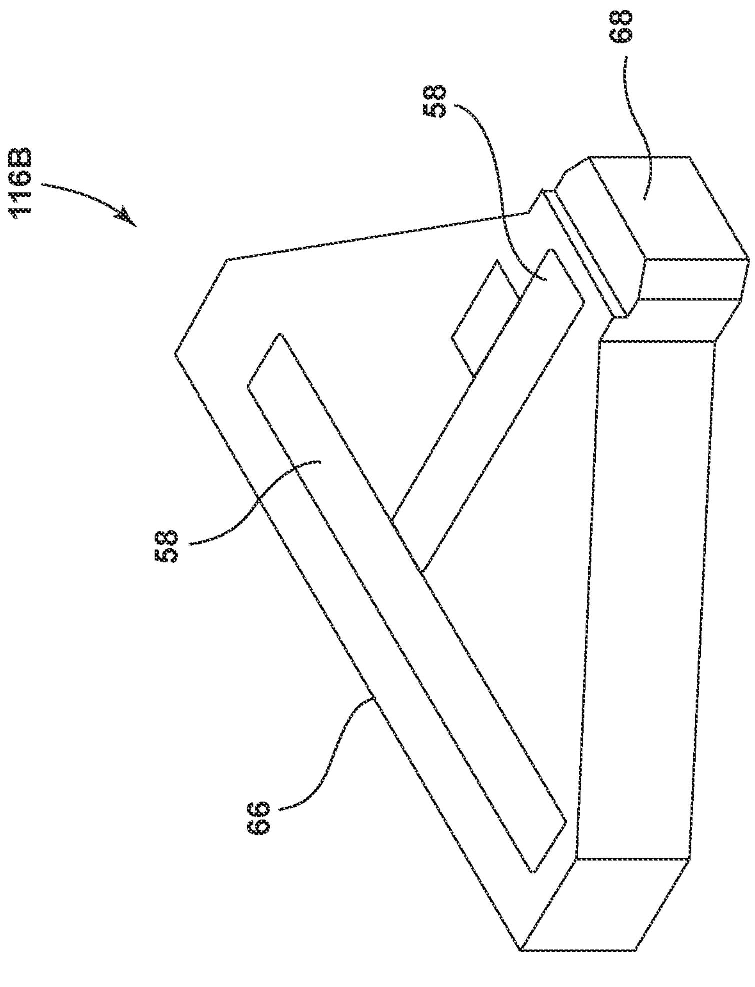
FIG. 5 is a bottom perspective view of an upper pad according to an aspect of the present disclosure.

FIG. 4 illustrates the central pad 16A, where the outer shell 32 conforms closely with the components therein. With reference to FIGS. 2 and 4, the cushion 40 may define one or more recesses 62 that facilitate compression of the central pad 16A. The cushion 40 may further include one or more depressions 64 that at least partially define an outer perimeter of the cushion 40 and, by extension, the central pad 16A. The depressions 64 may be provided to contour areas of a patient's body, to provide spacing between adjacent pads 16A-16D (FIG. 1) and/or the like. For example, the illustrated central pad 16A in FIGS. 2-4 may be provided centrally on the support frame 14 (e.g., over the central pedestal 26) and located between adjacent pads 16B-16D to support the midsection of the patient's body. The central pad 16A may be larger than the adjacent pads 16B-16D. FIG. 5 illustrates a pad 116B with an alternative construction that is configured to receive a head of the patient. The pad 116B may include all the same components (e.g., the outer shell 32, one or more cushions 40, and components of the heating system 30) as that described in reference to the central pad 16A. The pad 116B includes an outer perimeter that extends between a first end 66 and a second end 68, where the outer perimeter narrows toward the second end 68. The second end 68 may be narrowed such that it is at least partially received by the depression 64 (FIG. 4) in the central pad 16A and the border between the pads 16A, 116B is not linear. The pad 116B may include a pair of the connecting elements 58 that are disposed in a perpendicular relationship to one another. With reference back to FIG. 1, the first construction of the top pad 16B may include an opposing depression 70 to support the patient. For example, the depression 64 and the opposing depression 70 may form a space to place the face of a patient, to facilitate articulation, and/or to provide operational space. The top pad 16B may include all the same components (e.g., the outer shell 32, one or more cushions 40, and components of the heating system 30) as that described in reference to the central pad 16A and the pad 116B with the alternative construction.

Figure 6:
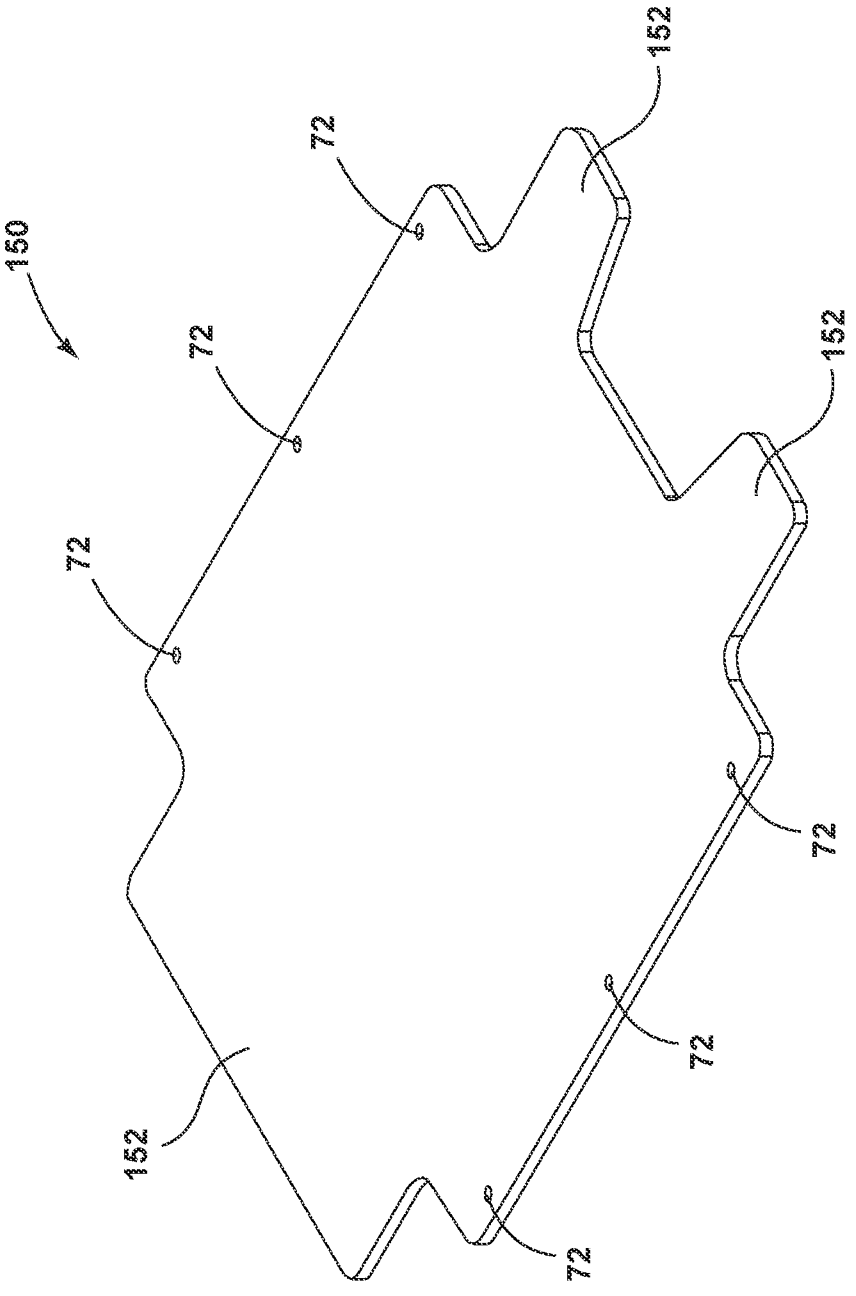
FIG. 6 is a top perspective view of a first plate of a heating system according to an aspect of the present disclosure.

FIG. 6 illustrates a first plate 150 in accordance with an alternative construction. The first plate 150 defines a series of flanges 152 on the outer perimeter thereof. The first plate 150 may be formed of a conductive material (e.g., a metal sheet such as aluminum) and is connected to the at least one conduit 44. The first plate 150 may include one or more apertures 72 to facilitate mechanical connection between components (e.g., the connection bands 56). Alternatively, both constructions of the first plate 50, 150 may be formed of a flexible conductive material. For example, the conductive material may be formed of silicone, rubber, and fiberglass. In some embodiments, the conductive material may be formed of polyimide, carbons, conductive fabrics, foams with conductive additives (e.g., graphite), copper traces, and/or the like. With reference again to FIG. 3A, a first temperature sensor 74 may be operably connected to the first plate 50, 150 and a second temperature sensor 76 may be operably connected proximate or directly to the patient. For example, the second temperature sensor 76 may be located on an interior surface of the top shell surface 36. In operation, the first temperature sensor 74 may measure a temperature of the first plate 50, 150 and/or heat radiating from the first plate 50, 150 and the second temperature sensor 76 may measure a temperature of the patient (e.g., by measuring the temperature of the patient directly or the top shell surface 36). The patient operating table may further include a weight sensor 77 to measure the weight of the patient.

Figure 7:
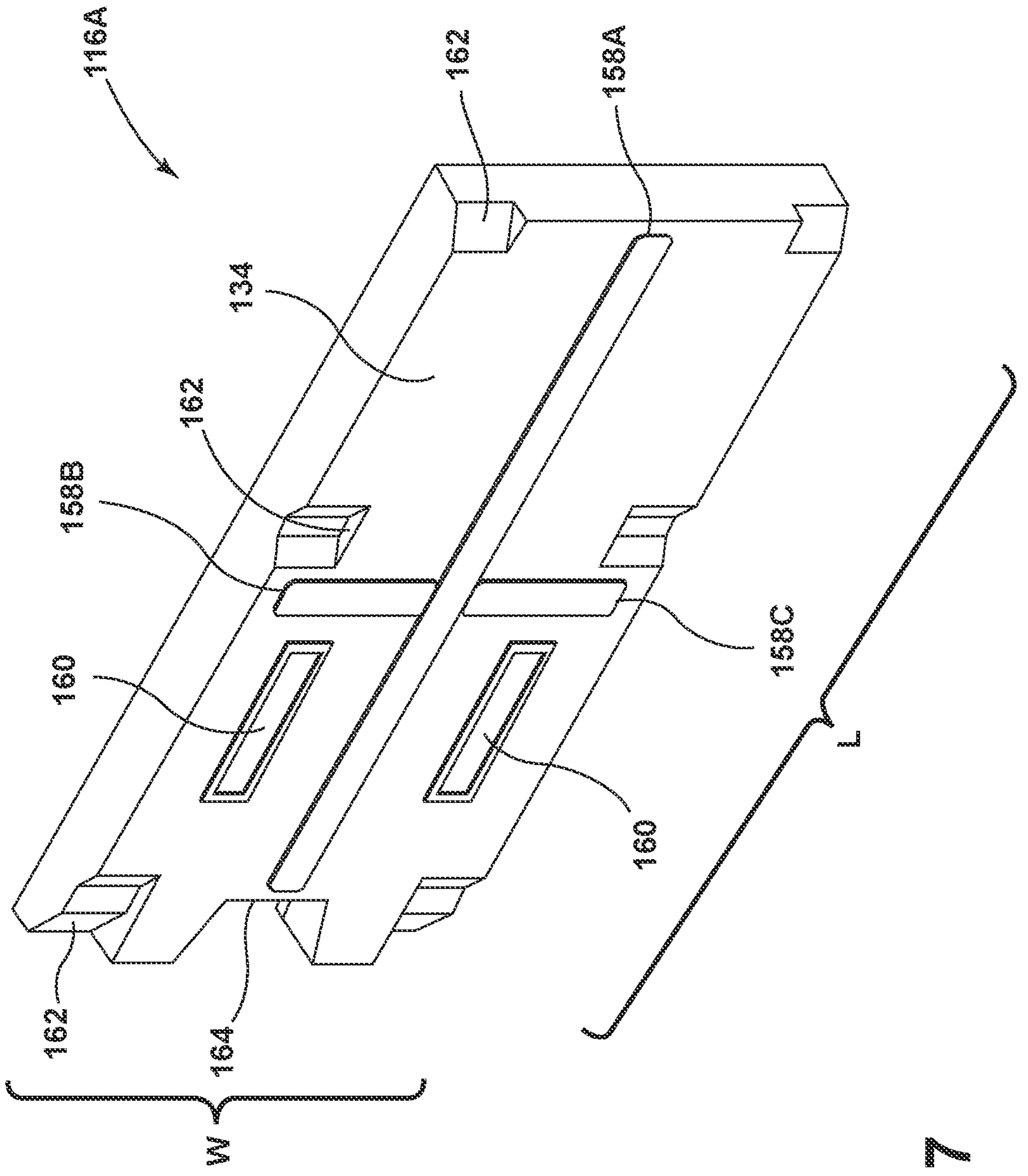
FIG. 7 is a bottom perspective view of a first alternative construction of a central pad according to an aspect of the present disclosure.

FIG. 7 illustrates a first alternative construction of a central pad 116A. The central pad 116A may include all the same functionalities and related components (e.g., the outer shell 32, one or more cushions 40, and components of the heating system 30) as that described in reference to the central pad 16A. The bottom shell surface 134 of the central pad 116A includes three connecting elements 158A-158C. A first connecting element 158A extends centrally along a length of the bottom shell surface 134, a second connecting element 158B extends centrally along a width of the bottom shell surface 134 (e.g., between an outer perimeter of the bottom shell surface 134 to the first connecting element 158A), and a third connecting element 158C extends centrally along the width of the bottom shell surface 134 (e.g., between an outer perimeter of the bottom shell surface 134 to the first connecting element 158A on an opposite side than the second connecting element 158B). In other words, the connecting elements 158A-158C may define a cross-shape. One or more vents 160 are located on the bottom shell surface 134. The one or more vents 160 may be rectangularly shaped and extend with longer opposite sides parallel, or substantially parallel, to the length of the bottom shell surface 134. The one or more vents 160 may include a pair of vents 160 located on opposite sides of the first connecting element 158A. The vents 160 may share all the same functionalities and features as the vent 60 described previously. The support frame 14 may define one or more holes, recesses, mesh, and/or the like that are aligned with the vents 160 to permit non-filtered medium to travel through the vents 160. The bottom shell surface 134 (and the one or more cushions 40) define one or more recesses 162 and depressions 164 (e.g., which may be configured to be located near a head or neck of the patient).

Figure 8:
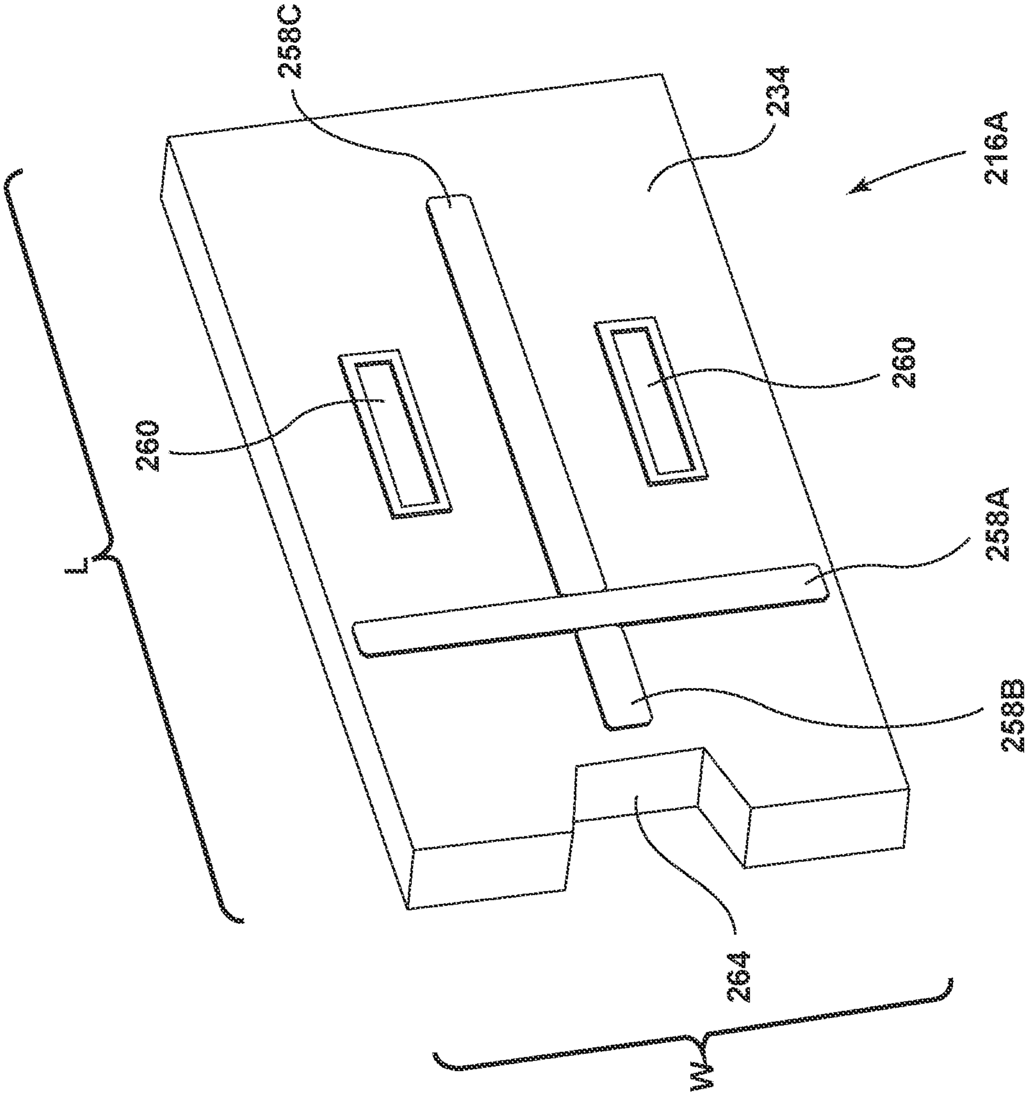
FIG. 8 is a bottom perspective view of a second alternative construction of a central pad according to an aspect of the present disclosure.

FIG. 8 illustrates a second alternative construction of a central pad 216A. The central pad 216A may include all the same functionalities and related components (e.g., the outer shell 32, one or more cushions 40, and components of the heating system 30) as that described in reference to the central pad 16A. The bottom shell surface 234 of the central pad 216A includes three connecting elements 258A-258C. A first connecting element 258A extends offset from center along a width of the bottom shell surface 234, a second connecting element 258B extends centrally along a length of the bottom shell surface 234 (e.g., between an outer perimeter of the bottom shell surface 234 to the first connecting element 258A), and a third connecting element 258C extends centrally along the length of the bottom shell surface 234 (e.g., between an outer perimeter of the bottom shell surface 234 to the first connecting element 258A on an opposite side than the second connecting element 258B). As such, the second connecting element 258B and the third connecting element 258C are unequal in length. The connecting elements 258A-258C may define a cross-shape. One or more vents 260 are located on the bottom shell surface 234. The one or more vents 260 may be rectangularly shaped and extend with longer opposite sides parallel, or substantially parallel, to the length of the bottom shell surface 234. The one or more vents 260 may include a pair of vents 260 located on opposite sides of the second connecting element 258B. The vents 260 may share all the same functionalities and features as the vent 60 described previously. The support frame 14 may define one or more holes, recesses, mesh, and/or the like that are aligned with the vents 260 to permit non-filtered medium to travel through the vents 260. The bottom shell surface 234 (and the one or more cushions 40) define a depression 264 (e.g., which may be configured to be located near the head or neck of the patient) along the outer perimeter of the central pad 216A that defines the width.

Figure 9:
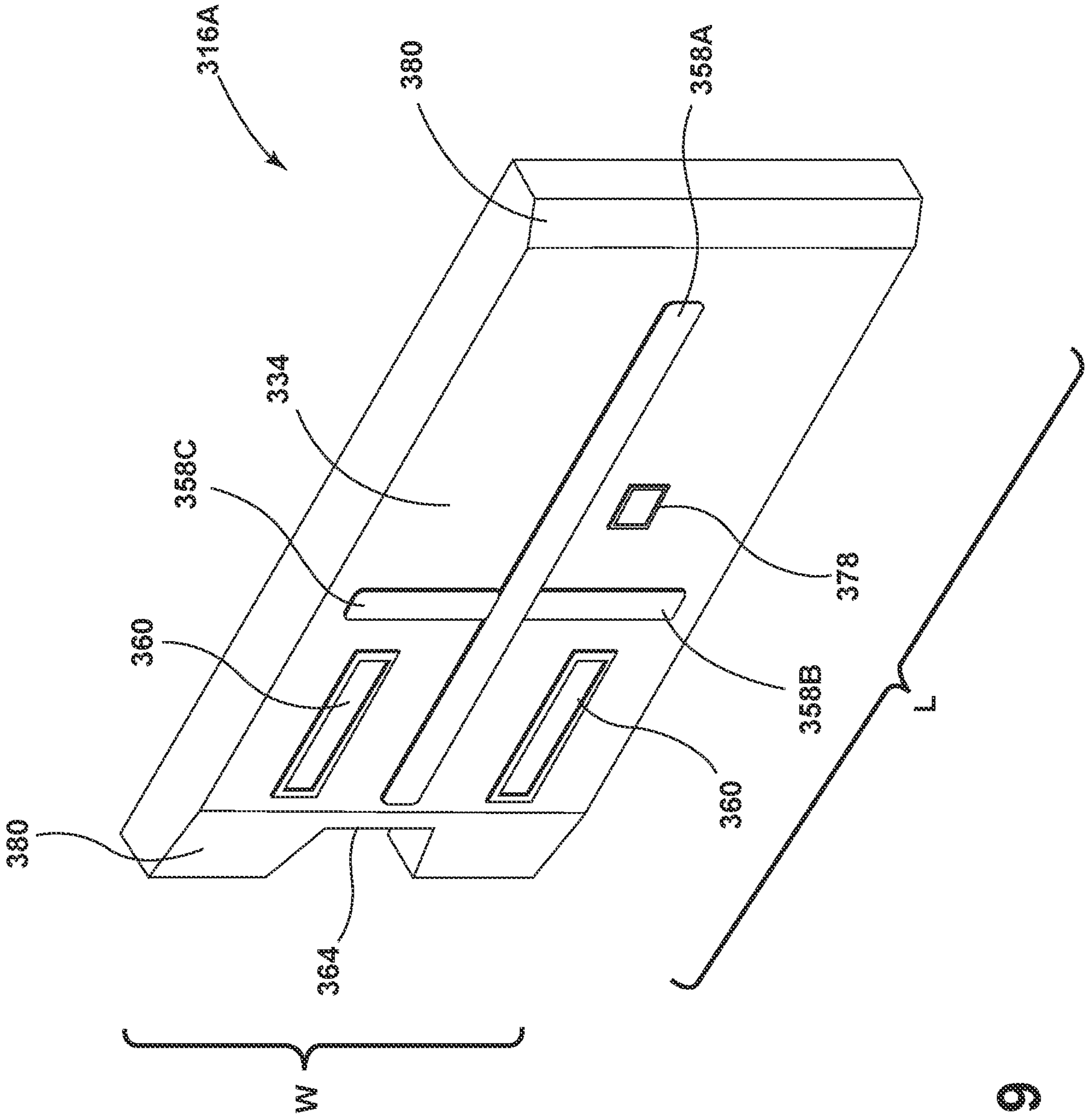
FIG. 9 is a bottom perspective view of a third alternative construction of a central pad according to an aspect of the present disclosure.

FIG. 9 illustrates a third alternative construction of a central pad 316A. The central pad 316A may include all the same functionalities and related components (e.g., the outer shell 32, one or more cushions 40, and components of the heating system 30) as that described in reference to the central pad 16A. The bottom shell surface 334 of the central pad 316A includes three connecting elements 358A-358C. A first connecting element 358A extends centrally along a length of the bottom shell surface 334, a second connecting element 358B extends centrally along a width of the bottom shell surface 334 (e.g., between an outer perimeter of the bottom shell surface 334 to the first connecting element 358A), and a third connecting element 358C extends centrally along the width of the bottom shell surface 334 (e.g., between an outer perimeter of the bottom shell surface 334 to the first connecting element 358A on an opposite side than the second connecting element 358B). In other words, the connecting elements 358A-358C may define a cross-shape. One or more vents 360 are located on the bottom shell surface 334. The one or more vents 360 may be rectangularly shaped and extend with longer opposite sides parallel, or substantially parallel, to the length of the bottom shell surface 334. The one or more vents 360 may include a pair of vents 360 located on opposite sides of the first connecting element 358A. The vents 360 may share all the same functionalities and features as the vent 60 described previously. The support frame 14 may define one or more holes, recesses, mesh, and/or the like that are aligned with the vents 360 to permit non-filtered medium to travel through the vents 360. The bottom shell surface 334 (and the one or more cushions 40) define a depression 364 (e.g., which may be configured to be located near the head or neck of the patient) along the outer perimeter of the central pad 316A defining the width. A label 378 may be provided on the bottom shell surface 334 to ensure compatibility with the support frame 14, operation type, or patient's body. Opposite sides of the outer perimeter of the central pad 316A that define the width may include chamfers 380 to facilitate articulation of the central pad 316A.

Figure 10:
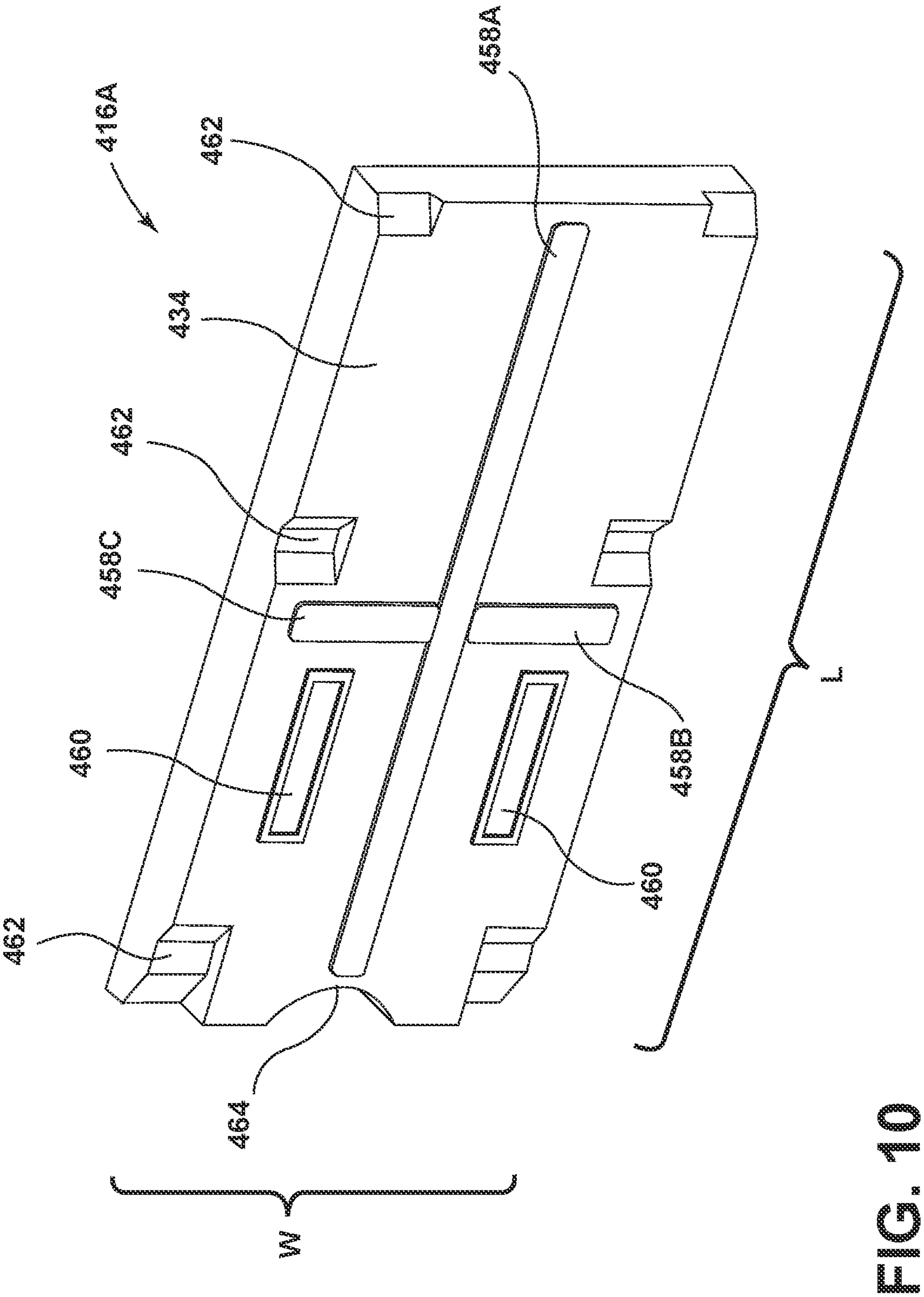
FIG. 10 is a bottom perspective view of a fourth alternative construction of a central pad according to an aspect of the present disclosure.

FIG. 10 illustrates a fourth alternative construction of a central pad 416A. The central pad 416A may include all the same functionalities and related components (e.g., the outer shell 32, one or more cushions 40, and components of the heating system 30) as that described in reference to the central pad 16A. The fourth alternative construction of the central pad 416A may be similar to the first alternative construction of the central pad 116A, as illustrated in FIG. 7. Similar to the constructions of the central pad 116A, a bottom shell surface 434 of the central pad 416A includes three connecting elements 458A-458C. A first connecting element 458A extends centrally along a length of the bottom shell surface 434, a second connecting element 458B extends centrally along a width of the bottom shell surface 434, and a third connecting element 458C extends centrally along the width of the bottom shell surface 434, and define a cross-shape. The bottom shell surface 434 also includes one or more vents 460 and one or more recesses 462. The vents 460 may be rectangularly shaped and share all the same functionalities and features as the vent 60 described previously. The support frame 14 may define one or more holes, recesses, mesh, and/or the like that are aligned with the vents 460 to permit non-filtered medium to travel through the vents 460. The central pad 416A defines a depression 464 with a rounded peripheral edge (e.g., which may be configured to be located near the head or neck of the patient).

Figure 11:
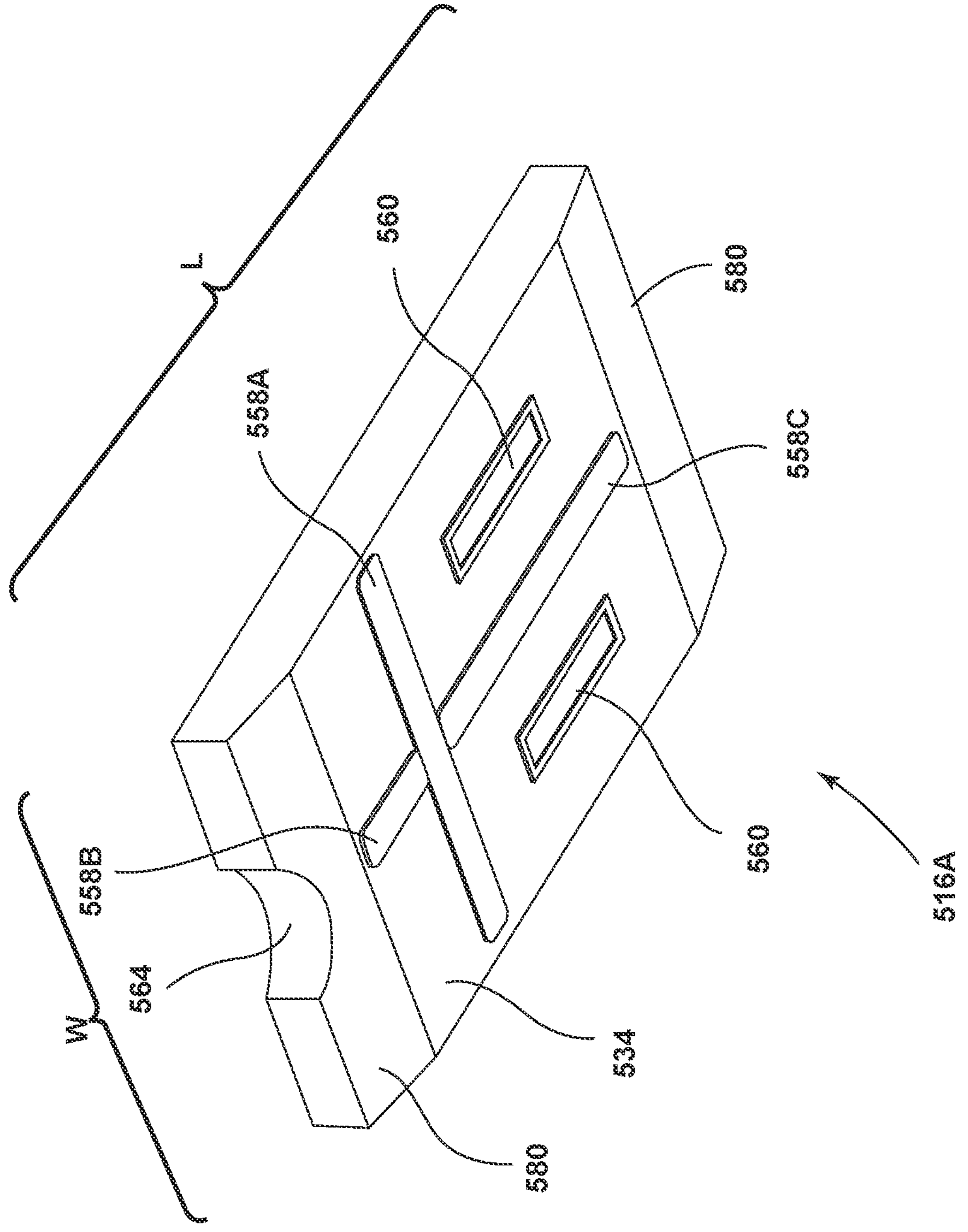
FIG. 11 is a bottom perspective view of a fifth alternative construction of a central pad according to an aspect of the present disclosure.

FIG. 11 illustrates a fifth alternative construction of a central pad 516A. The central pad 516A may include all the same functionalities and related components (e.g., the outer shell 32, one or more cushions 40, and components of the heating system 30) as that described in reference to the central pad 16A. The fifth alternative construction of the central pad 516A may be similar to the third alternative construction of the central pad 316A, as illustrated in FIG. 9. Similar to the constructions of the central pad 316A, a bottom shell surface 534 of the central pad 516A includes three connecting elements 558A-558C. A first connecting element 558A extends centrally along a length of the bottom shell surface 534, a second connecting element 558B extends centrally along a width of the bottom shell surface 534, and a third connecting element 558C extends centrally along the width of the bottom shell surface 534, and define a cross-shape. The bottom shell surface 534 also includes one or more vents 560. The vents 560 may be rectangularly shaped and share all the same functionalities and features as the vent 60 described previously. The support frame 14 may define one or more holes, recesses, mesh, and/or the like that are aligned with the vents 560 to permit non-filtered medium to travel through the vents 560. The central pad 516A defines a depression 564 with a rounded peripheral edge (e.g., which may be configured to be located near the head or neck of the patient). Opposite sides of the outer perimeter of the central pad 516A that define the width may include chamfers 580 to facilitate articulation of the central pad 516A.

The controller or control system 100 may regulate the temperature of the one or more pads 16A-16D by providing energy to the one or more heating elements 42 in response to the temperature of the patient. The outer perimeter of the first plate 50, 150 may substantially match a shape of the outer perimeter of the top shell surface 36 provided in any of the afore-described constructions. For example, the outer perimeter of the first plate 50, 150 may be inset from the outer perimeter of the top shell surface 36 by 1 cm or more, 2 cm or more, 5 cm or more, less than 20 cm, or less than 10 cm. The outer perimeter of the first plate 50, 150 of the central pad provided in any of the afore-described embodiments defines a width "W" and a length "L" thereof. The width W may be 40 cm or more, 50 cm or more, 60 cm or more, between 50 and 60 cm, or less than 70 cm. The length L may be larger than the width W to generally match the shape the body of the patient, and for example, the length L may be 80 cm or more, 100 cm or more, 120 cm or more, between 90 and 120 cm, or less than 140 cm. The control system 100 may be in operable communication with the first temperature sensor 74, the second temperature sensor 76, a power supply, and the weight sensor 77. As such, the control system 100 may be configured to energize the one or more heating elements 42 in response to the patient temperature (e.g., as obtained from the second temperature sensor 76). The control system 100 may further be configured to modify a length of time and/or a heating temperature (e.g., as obtained from the second temperature sensor 76) based on the patient's weight (e.g., as obtained from the weight sensor 77). For example, a patient with a greater weight may require additional heat output magnitude or heat output time to maintain a desired temperature. In the example, the controller or control system 100 may be configured to maintain the temperature of the patient between about 35 degrees Celsius and about 39 degrees Celsius, for example, between about 36 degrees Celsius and about 38 degrees Celsius (e.g., normothermia). It should be appreciated that, unless explicatory stated or contradictory, the elements, shapes, constructions, and functionalities described in reference to any embodiment and/or construction herein may be applied to any of the one or more pads 16A-16D described herein for temperature regulation of the entire body.

The invention disclosed herein is further summarized in the following paragraphs and is further characterized by combinations of any and all of the various aspects described therein.

According to one aspect of the disclosure, patient operating table includes a support mattress with a plurality of pads. The plurality of pads includes a central pad located to support a midsection of a patient's body. The central pad includes an outer shell with a seam that has a hermetic seal and defines a cell therein. A support frame is integrally connected to the central pad. A central pedestal is located under the central pad and carries the support mattress on a base frame. A heating element and a hygroscopic substance is located in the cell. A conduit extends from the heating element and through the outer shell at a sealing ring that is connected to the outer shell with a hermetic seal.

According to another aspect of the disclosure, at least one vent is connected to an outer shell with a hermetic seal. The at least one vent includes a filtering membrane.

According to another aspect of the disclosure, a filtering membrane is configured to permit a passage of air and block a passage of at least one pathogen.

According to another aspect of the disclosure, a heating element includes a radiant plate formed of a conductive material.

According to another aspect of the disclosure, a heating element includes a diffusive plate formed of a thermally diffusive material that is sandwiched between a cushion and a radiant plate, the cushion being formed of a material with less thermal diffusivity than the thermally diffusive material.

According to another aspect of the disclosure, a patient operating table includes a first temperature sensor for monitoring a temperature of the heating element and a second temperature sensor for monitoring a temperature of the patient.

According to yet another aspect of the disclosure, a control system is configured to receive temperature readings from a first and a second temperature sensor and maintain a temperature of a patient between about 36 degrees Celsius and about 38 degrees Celsius.

According to still yet another aspect of the disclosure, a patient operating table includes a weight sensor for measuring a weight of a patient and the control system is further configured to adjust the temperature of a heating element based on the weight of the patient.

According to one aspect of the present disclosure, a pad for a patient operating table includes an outer shell that includes a bottom shell surface for connection to the patient operating table and a top shell surface for supporting a patient. A cell is defined within the outer shell and at least one cushion is located in the cell. At least one heating element is located in the cell between the at least one cushion and the top shell surface. At least one vent is connected to the outer shell with a hermetic seal. The at least one vent includes a filtering membrane that permits a passage of air and blocks a passage of at least one pathogen.

According to another aspect of the disclosure, at least one vent is located on a bottom shell surface.

According to another aspect of the disclosure, a top shell surface and a bottom shell surface are bonded at a seam with a hermetic seal.

According to another aspect of the disclosure, a bottom shell surface includes at least one connecting element for connecting and releasing the bottom shell surface to a patient operating table.

According to another aspect of the disclosure, at least one connecting element includes a series of hooks or loops to connect to a corresponding element of a patient operating table.

According to another aspect of the disclosure, a heating element includes a radiant plate formed of a conductive material.

According to another aspect of the disclosure, the conductive material is flexible.

According to another aspect of the disclosure, a conduit extends from a radiant plate and through an outer shell.

According to another aspect of the disclosure, an outer shell is connected to a sealing ring with a hermetic seal and a conduit extends through the sealing ring.

According to another aspect of the disclosure, a heating element defines a diffusive plate located between a top shell surface and a radiant plate and a cushion is formed of a first foam material and the diffusive plate is formed of a second foam material that is more dense than the first foam material.

According to one aspect of the disclosure, a patient operating table includes a support mattress with at least one pad. The at least one pad includes an outer shell that defines a cell. A filtering membrane is connected to the outer shell with a hermetic seal. The membrane is rated to prevent select pathogens from entering the cell. A heating element is located in the cell and is formed of at least one of a flexible or a compressive material.

According to another aspect of the disclosure, a patient operating table includes a conduit that extends from a heating element and through an outer shell at a sealing ring that is connected to the outer shell with a hermetic seal.

According to one aspect of the disclosure, a patient operating table includes a support mattress with at least one pad. A support mattress is connected to the at least one pad. The at least one pad includes an outer shell with a seam that has a hermetic seal and defines a cell therein. A heating element and a hygroscopic substance is located in the cell. A conduit extends from the heating element and through the outer shell at a sealing ring that is connected to the outer shell with a hermetic seal.

According to another aspect of the disclosure, at least one pad includes at least one connecting element to connect and release a central pad to a support frame.

According to another aspect of the disclosure, at least one pad is integrally connected to a support frame.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A pad for a patient operating table, the pad comprising:

an outer shell including a bottom shell surface for connection to said patient operating table and a top shell surface for supporting a patient;

a cell defined within the outer shell;

at least one cushion located in the cell;

at least one heating element located in the cell between the at least one cushion and the top shell surface; and at least one vent located on the bottom shell surface and connected to the outer shell with a hermetic seal, wherein the at least one vent includes a filtering membrane that permits a passage of air and blocks a passage of at least one pathogen.

2. The pad of claim 1, wherein the at least one vent includes a pair of vents.

3. The pad of claim 1, wherein the top shell surface and the bottom shell surface are bonded at a seam to form the hermetic seal.

4. The pad of claim 1, wherein the bottom shell surface includes at least one connecting element for connecting and releasing the bottom shell surface to said patient operating table.

5. The pad of claim 4, wherein the at least one connecting element includes a series of hooks or loops to connect to a corresponding element of said patient operating table.

6. The pad of claim 1, wherein the heating element includes a radiant plate formed of a conductive material.

7. The pad of claim 6, wherein the conductive material is flexible.

8. The pad of claim 7, wherein a conduit extends from the radiant plate and through the outer shell.

9. The pad of claim 8, wherein the outer shell is connected to a sealing ring with a second hermetic seal and the conduit extends through the sealing ring.

10. The pad of claim 6, wherein the heating element further defines a diffusive plate located between the top shell surface and the radiant plate and at least one cushion is formed of a first foam material and the diffusive plate is formed of a second foam material that is more dense than the first foam material.

11. The pad of claim 1, further comprising:

a first temperature sensor for monitoring a temperature of the at least one heating element; and a second temperature sensor for monitoring a temperature of the patient.

12. The pad of claim 11, further including a control system configured to receive temperature readings from the first and second temperature sensors and maintain the temperature of the patient between 36 degrees Celsius and 38 degrees Celsius.

13. The pad of claim 1, wherein the heating element is formed of a compressive material.

14. The pad of claim 1, wherein the at least one heating element further includes a diffusive plate formed of a thermally diffusive material that is sandwiched between the at least one cushion and a radiant plate formed of a conductive material, the at least one cushion being formed of a material with less thermal diffusivity than the thermally diffusive material.

15. A pad for a patient operating table, the pad comprising:

an outer shell including a bottom shell surface for connection to said patient operating table and a top shell surface for supporting a patient;

a cell defined within the outer shell;

at least one cushion located in the cell;

at least one heating element located in the cell between the at least one cushion and the top shell surface, the at least one heating element including a radiant plate formed of a conductive material and a diffusive plate located between the top shell surface and the radiant plate, wherein the at least one cushion is formed of a first foam material and the diffusive plate is formed of a second foam material that is more dense than the first foam material; and at least one vent connected to the outer shell with a hermetic seal, wherein the at least one vent includes a filtering membrane that permits a passage of air and blocks a passage of at least one pathogen.

16. A pad for a patient operating table, the pad comprising:

an outer shell including a bottom shell surface for connection to said patient operating table and a top shell surface for supporting a patient;

a cell defined within the outer shell;

at least one cushion located in the cell;

at least one heating element located in the cell between the at least one cushion and the top shell surface, the at least one heating element including a diffusive plate formed of a thermally diffusive material that is sandwiched between the at least one cushion and a radiant plate formed of a conductive material, wherein the at least one cushion is formed of a material with less thermal diffusivity than the thermally diffusive material; and at least one vent connected to the outer shell with a hermetic seal, wherein the at least one vent includes a filtering membrane that permits a passage of air and blocks a passage of at least one pathogen.

* * * * *